(12) United States Patent
Arai et al.

(10) Patent No.: US 7,074,523 B2
(45) Date of Patent: Jul. 11, 2006

(54) LITHIUM SECONDARY BATTERY

(75) Inventors: Juichi Arai, Higashiibaraki-gun (JP); Shuuko Yamauchi, Hitachi (JP); Mitsuru Kobayashi, Hitachiohta (JP)

(73) Assignee: Hitachi, Ltd. (JP)

( * ) Notice: Subject to any disclaimer, the term of this patent is extended or adjusted under 35 U.S.C. 154(b) by 355 days.

(21) Appl. No.: 10/725,328

(22) Filed: Dec. 2, 2003

(65) Prior Publication Data

US 2004/0106039 A1 Jun. 3, 2004

Related U.S. Application Data

(63) Continuation of application No. 09/928,406, filed on Aug. 14, 2001, now abandoned.

(30) Foreign Application Priority Data

May 15, 2001 (JP) .............................. 2001-144098

(51) Int. Cl.
  *H01M 6/16* (2006.01)
(52) U.S. Cl. ....................................... 429/326; 429/324
(58) Field of Classification Search ................ 429/326, 429/324
  See application file for complete search history.

(56) References Cited

U.S. PATENT DOCUMENTS

| 5,879,834 | A | 3/1999 | Mao |
| 6,210,835 | B1 | 4/2001 | Arai |
| 6,277,525 | B1 | 8/2001 | Yamamoto et al. |

FOREIGN PATENT DOCUMENTS

| JP | 06-017447 | 1/1994 |
| JP | 06-338347 | 12/1994 |
| JP | 7-249432 | 9/1995 |
| JP | 07-302614 | 11/1995 |
| JP | H7-302614 | 11/1995 |
| JP | 09-050822 | 2/1997 |
| JP | 09-106835 | 4/1997 |
| JP | 9-106835 | 4/1997 |
| JP | 10-112335 | 4/1998 |
| JP | 11-7932 | 1/1999 |
| JP | 11-86901 | 3/1999 |
| JP | 11-162508 | 6/1999 |
| JP | 11-162512 | 6/1999 |
| JP | 11-329491 | 11/1999 |
| JP | 2000-058112 | 2/2000 |
| JP | 2000-058113 | 2/2000 |
| JP | 2000-058114 | 2/2000 |
| JP | 2000-058116 | 2/2000 |
| JP | 2000-058117 | 2/2000 |
| JP | 2000-156243 | 6/2000 |

*Primary Examiner*—Bruce F. Bell
(74) *Attorney, Agent, or Firm*—Dickstein Shapiro Morin & Oshinsky LLP

(57) ABSTRACT

The present invention provides a lithium secondary battery comprising a nonaqueous electrolytic solution containing a compound which is oxidized at a voltage higher than a charge end voltage of the lithium secondary battery and a compound which inhibits reactions at voltages lower than said charge end voltage.

58 Claims, 1 Drawing Sheet

LITHIUM SECONDARY BATTERY

This application is a continuation of application Ser. No. 09/928,406, filed on Aug. 14, 2001 now abandoned, which is hereby incorporated by reference in its entirety.

FIELD OF THE INVENTION

The present invention relates to a lithium secondary battery and, more particularly, to a lithium secondary battery having improved overcharge characteristics as well as an electrical appliance utilizing the lithium secondary battery.

DISCUSSION OF THE RELATED ART

The rapid diffusion of portable electronic machines or appliances has created a demand for smaller and lighter batteries as their power source. Primary batteries that meet this demand are lithium primary cells having an anode of lithium metal which are small is size and light in weight and yet have a high capacity. Unfortunately, they cannot be used repeatedly by charging and hence they are limited in use. Secondary batteries such as lead batteries, nickel-cadmium batteries, and nickel-hydrogen batteries can be used repeatedly, but they are low in operating voltage because they rely on an aqueous electrolytic solution. Therefore, they are not suitable for use which requires high capacity, small size, and light weight.

Demand for a secondary battery having a high capacity, small size, and light weight has been met by the development of a practical lithium ion battery. It has found widespread use in portable electronic and communications machines and equipment, such as CAM coder, digital camera, cellular phone, and notebook computer. It has also found as a power source for hybrid cars and pure electric cars.

A lithium ion battery is characterized by its anode and cathode active materials made of a substance capable of occluding and releasing lithium ions. In principle, it works without requiring electrodeposition of lithium metal. Its anode and cathode may be made of a variety of substances capable of occluding and releasing lithium ions. Their combination permits one to design the battery capacity and working voltage as desired. For example, the cathode is practically made of a carbonaceous material. It is expected to be made of a Group IVA element or an oxide thereof, a lithium-transition metal composite nitride, or an organic compound such as polyacetylene. The anode is practically made of $LiMn_2O_4$ or $LiCoO_2$ and will be made of $LiNiO_2$, $LiFeO_2$, or $LiMnO_2$ under developmental stage. A lithium ion battery formed from the above-mentioned anode active material and a carbonaceous material for the cathode undergoes charging by the following mechanism. The anode permits lithium to dissolve in an electrolytic solution composed of an organic solvent and a lithium salt (as en electrolyte) dissolved therein. The cathode (which is separated from the anode by a fine porous separator) causes the carbonaceous material to occlude (by intercalation) lithium ions from the electrolytic solution. Discharging proceeds in the reverse process, thereby delivering electrons to the external circuit.

The above-mentioned lithium ion battery has a designed battery capacity which is determined by the amount of lithium in the anode or the capacity of the cathode occluding lithium ions, whichever smaller. Charging in excess of this battery capacity is referred to as overcharging. In the overcharging state, the anode releases more lithium than it should keep, causing the active material to disintegrate, and the cathode receives excess lithium ions, causing lithium metal to separate out (a phenomenon called dendrite). This results in the battery increasing in voltage and temperature. Thus, overcharging of lithium batteries poses a problem with battery safety.

To address this problem, there has been proposed a method of inhibiting overcharging by causing the electrolytic solution to consume current when overcharging occurs. See, for example, Japanese Patent Laid-open Nos. 338347/1994, 302614/1995, 106835/1997, 17447/1994, 50822/1997, and 162512/1999. The proposed method consists of incorporating the electrolytic solution with an aromatic compound which has an oxidation potential which is higher than the anode potential (usually 4.1–4.3 V) at the time of charging. The object is achieved as the aromatic compound undergoes oxidation reaction, thereby consuming overcharging current and inhibiting reactions due to overcharging. This action is attributable to the oxidation reduction reaction of the π electron conjugated system of the aromatic compound.

The above-mentioned aromatic compound produces a good effect of inhibiting overcharging but has a disadvantage of deteriorating the cycle characteristics and storage characteristics of the battery.

In order to address this problem, there has been proposed a new compound, as disclosed in Japanese Patent Laid-open Nos. 156243/2000, 58112/2000, 58113/2000, 58114/2000, 58116/2000, and 58117/2000. The proposed compound produces a good effect but has a disadvantage because it contains many phenyl groups in the molecule and hence has a high molecular weight. The disadvantage is that the compound is low in solubility (and hence is limited in its amount that can be added to the electrolytic solution) and has an extended π electron conjugated system (to inhibit overcharging), with the result that consumption of overcharging current by each methyl group is low and the effect per unit amount added is poor.

SUMMARY OF THE INVENTION

It is an object of the present invention to provide an electrolyte with a compound which has a high solubility and a low molecular weight. It is another object of the present invention to provide a lithium battery having improved safety owing to an electrolytic solution which effectively inhibits overcharging and has no adverse effect on storage characteristics. Further, another object of the present invention is to provide an electrical appliance utilizing the lithium secondary battery of the present invention.

According to the present invention, the above-mentioned object is achieved by a lithium secondary battery which is characterized in that its nonaqueous electrolytic solution contains a compound which is oxidized at a voltage higher than the charge end voltage of the lithium secondary battery and a compound which inhibits reactions at voltages lower than said charge end voltage.

The lithium secondary battery of the present invention is characterized in that it has a charge capacity of $C_1$ when it (in discharged state) is charged with constant current until a voltage $V_1$ of 1.2V is reached and it has a charge capacity of $C_2$ when it is charged further (at a voltage higher than $V_1$) until it cannot be charged any longer, with the ratio (ξ) of $C_1/C_2$ being lower than 0.7.

The lithium secondary battery of the present invention achieves its good performance owing to the electrolytic solution which contains a fluorinated solvent represented by the chemical formula (1) below and an aromatic compound represented by the chemical formula (2) as an overcharge inhibiting substance.

$Rf_1-X-Rf_2$ (1)

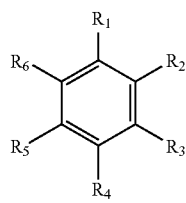

(2)

An overcharge inhibiting substance represented by the chemical formula (3) below produces a better effect.

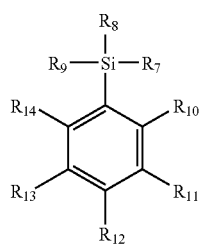

(3)

The fluorinated solvent represented by the chemical formula (1), which is to be incorporated into the electrolytic solution, is exemplified by the following.

2,2,2-trifluoromethyl ethyl ether,
2,2,2-trifluoroethyl difluoromethyl ether,
2,2,3,3,3-pentafluoropropyl methyl ether,
2,2,3,3,3-pentafluoropropyl difluoromethyl ether,
2,2,3,3,3-pentafluoropropyl 1,1,2,2-tetrafluoroethyl ether,
1,1,2,2-tetrafluoroethyl methyl ether,
1,1,2,2-tetrafluoroethyl ethyl ether,
1,1,2,2-tetrafluoroethyl 1,1,2,2-trifluoroethyl ether,
2,2,3,3,3-tetrafluoropropyl difluoromethyl ether,
1,1,2,2-tetrafluoroethyl 2,2,3,3-trifluoroethyl ether,
Hexafluoroisopropyl methyl ether,
1,1,3,3,3-pentafluoro-2-trifluoromethylpropyl methyl ether,
1,1,2,3,3,3-hexafluoropropyl methyl ether,
1,1,2,3,3,3-hexafluoropropyl ethyl ether,
2,2,3,4,4,4-hexafluorobutyl difluoromethyl ether,
Methyl perfluoropropionate,
Methyl perfluorobutyrate,
Ethyl perfluorobutyrate,
Methyl perfluorooctanate,
Ethyl perfluorooctanate,
Ethyl difluoroacetate,
Ethyl 5H-octafluoropnetanoate,
Ethyl 7H-decafluoroheptanoate,
Ethyl 9H-decafluoronanoate,
Methyl 2-trifluoromethyl-3,3,3-trifluoropropionate,
Methyl nanofluorobutyl ether,
Ethyl nanofluorobutyl ether,
Propyl nanofluorobutyl ether, and
Butyl nanofluorobutyl ether.

Other solvents than fluorinated solvents include the following.

Cyclic or chain esters (such as ethylene carbonate, fluoropropylene carbonate, butylene carbonate, chloroethylene carbonate, fluoroethylene carbonate, difluoroethylene carbonate, trifluoromethylpropylene carbonate, vinylene carbonate, dimethylvinylene carbonate, dimethyl carbonate, ethylmethyl carbonate, diethyl carbonate, diphenyl carbonate, 1,3-propylene carbonate, and 2,2-dimethyl-1,3-propylene carbonate); cyclic or chain ethers (such as dimethoxy methane, 1,2-dimethoxyethane, diglyme, triglyme, 1,3-dioxolane, tetrahydrofuran, and 2-methylterahydrofuran); γ-butyrolactone, sulfolane, methyl propionate, ethyl propionate, ethylene sulfide, dimethylsulfoxide, ethylmethylsulfoxide, -diethylsulfoxide, methylpropylsulfoxide, and ethylpropylsulfoxide. They may be used alone or in combination with one another.

The electrolytic solution of the lithium battery contains a lithium salt as the supporting electrolyte.

Examples of the supporting electrolyte include $LiPF_6$, $LiBF_4$, $LiClO_4$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, $LiI$, $LiCl$, $LiF$, $LiPF_5(SO_2CF_3)$, and $LiPF4(SO_2CF_3)_2$.

They may be used alone or in combination with one another.

Examples of the overcharge inhibiting compound represented by the chemical formula 2 or 3 include the following.

4-biphneyl acetate, phehyl propionate, 4-biphenyl benzoate, 4-biphenylbenzyl carboxylate, 2-biphenyl propionate, 1,4-diphenoxybenzene, 1,3-diphenoxybenzene, diphenyl ether, 3-phenxytoluene, anisole, 2-chloroanisole, 3-chloroanisole, 4-fluoroanisole, 4-chloroanisole, 4-bromoanisole, 2,4-difluoroanisole, 3,5-difluoroanisole, 2,4-dichloroanisole, 2,4-dibromoanisole, ethoxybenzene, 2,4-difluoroethoxybenzene, 2,4-difluoropropoxybenzene, 2,5-difluoroanisole, 2,6-difluoroanisole, 3,4-difluoroanisole, 3,5-fluoroanisole, 1,2-dimethoxybenzene, 1,2-dimethoxy-4-fluorobenzne, 1,2-dimethoxy-4-chlorobenzene, 1,2-diemthoxy-4-bromobenzene, 1,3-dimethoxy-5-bromobenzene, 2,4-dichlorotoluene, 2-chloroxylene, 4-chloro-o-xylene, and 4-bromo-m-xylene. Other examples include phenyltrimethylsilane, benzyltrimethylsilane, diphehylmethylsilane, diphenyldimethoxysilane, diphenylsilane, 4-methoxyphenylmethylsilane, and triphenylsilane.

The cathode of the lithium secondary battery may be formed from lithium metal, lithium-aluminum alloy, natural or artificial graphite, amorphous carbon, a composite material of carbon with a substance (such as silicon, germanium, and aluminum) which can be alloyed with lithium, or silicon oxide or tin oxide or a composite material thereof with carbon.

The anode of the lithium secondary battery may be formed from any of the following materials. A composite oxide of lithium with cobalt, nickel, or iron; a material incorporated with transition metal, silicon, germanium, aluminum, manganese, or magnesium; lithium manganate or a mixture thereof with lithium, transition metal, silicon, germanium, aluminum, manganese, or magnesium; or a material whose crystal is partly replaced by any of the above-mentioned materials.

The separator of the lithium secondary battery may be formed from a fine porous film of polymeric material such as polyethylene, polypropylene, vinylene copolymer, and polybutylene. The porous film may be used in the form of double-layered or triple-layered laminate.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Figure 1:
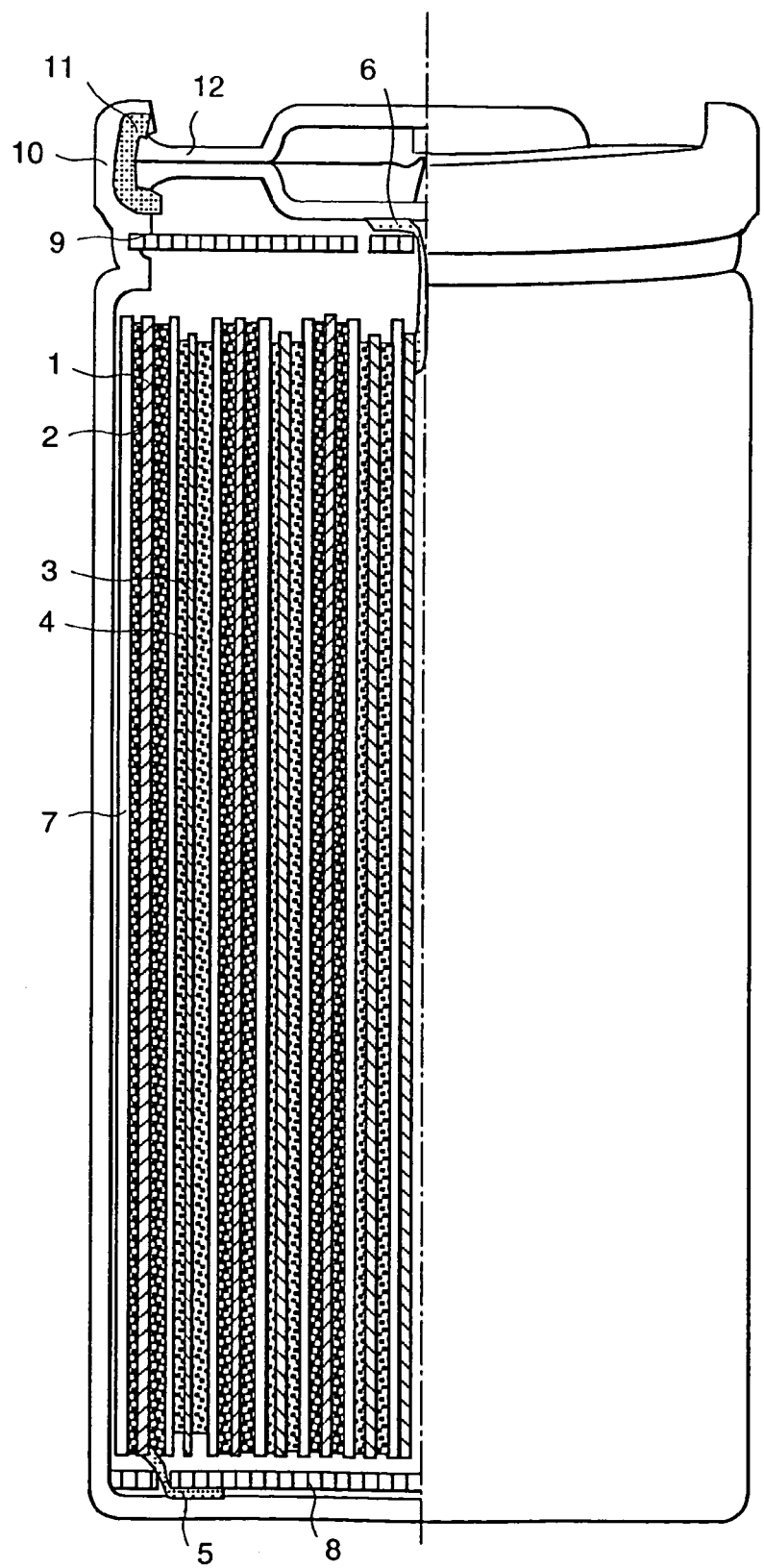
FIG. 1 is a sectional view of the cylindrical lithium secondary battery in one embodiment of the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings. The invention will be described in more detail with reference to the following examples which are not intended to restrict the scope thereof.

COMPARATIVE EXAMPLE 1

This comparative example is designed to evaluate the overcharging characteristics and storage characteristics. A cylindrical lithium secondary battery constructed as shown in FIG. 1 was produced in the following manner. For the cathode active material, a mixture was prepared from artificial graphite (mesophase microbeads) and PVDF as a binder in a ratio of 91:9 by weight. The mixture was dissolved in N-methylpyrrolidone (NMP for short) as a solvent to give a paste. This paste was applied to both sides of copper foil as a cathode current collector 1. The coating was dried, pressed with heating, and vacuum-dried. In this way the cathode layer 2 was formed on both sides of the cathode current collector 1. Thus there was obtained the cathode. For the anode active material, a mixture was prepared from lithium cobaltite, graphite as a conducting material, and PVDF as a binder in a ratio of 85:7:8 by weight. The mixture was dissolved in NMP as a solvent to give a paste. This paste was applied to both sides of aluminum foil as an anode current collector 3. The coating was dried, pressed with heating, and vacuum-dried. In this way the anode layer 4 was formed on both sides of the anode current collector 3. Thus there was obtained the anode. A cathode lead 5 and an anode lead 6 (both made of nickel foil) were attached by electric welding respectively to the uncoated parts of the cathode and anode. The cathode and anode, with a separator 7 interposed between them, were wound up. The outermost separator was fixed with a tape. The thus obtained electrode group was inserted into a battery can 10 of stainless steel, in such a way that the cathode lead 5 comes into contact with the bottom of the can, with a polypropylene insulator 8 interposed between them. The cathode lead 5 was connected by electric welding to the battery can 10 so as to form the cathode circuit. The anode lead 6 was connected by electric welding to the anode cap 12, with an anode insulator 9 interposed between them. For the electrolytic solution, a mixed solvent was prepared from ethylene carbonate (EC) and dimethyl carbonate (DMC) in a ratio of 1:2 by volume. In this solvent was dissolved 1M (mol/dm$^{-3}$) of LIPF$_6$. (The composition of the electrolytic solution will be described as "1M LiPF$_6$ EC/DMC (1/2 by volume)" hereinafter.) The thus obtained electrolytic solution (about 4 ml) was poured into the battery can 10 through its opening. The cathode can 10 was mechanically crimped with an anode cap 12 (with a gasket 11). Thus there was obtained the cylindrical lithium secondary battery (cobalt-based battery) for Comparative Example 1. Incidentally, the anode cap 12 is equipped with a safety device which is a pressure switch CID (Current Interrupt Device, which opens the circuit at about 100 kPa) consisting of heat-sensitive resistance element PTC (Positive Temperature Coefficient, resistance trip temperature at about 80° C.) and aluminum foil circuit.

The thus obtained battery was charged at a constant current of 1 A and a constant voltage of 4.2 V, with the charge end current being 20 mA. Then the battery was discharged at a discharge current of 1 A, with the discharge end voltage being 3 V. In other words, V$_1$ was 4.2 V and the discharge voltage was 3 V. The charging-discharging cycle was repeated twice. Then the battery was charged until 4.2 V at a current of 1 A. The battery was charged further (for overcharging) at 1 A until charging was interrupted by the action of the safety device. It was found that the battery has a charging capacity C$_1$ of 1380 mAh when charged to 4.2 V and the battery has an overcharging capacity C$_2$ of 1300 mAh when overcharged until charging was interrupted by the safety device. It follows therefore that the safety effect (ξ) of the battery defined in the formula (4) below is 0.94.

$$\text{Safety effect } (\xi) = (\text{Overcharging effect } C_2)/(\text{Initial discharge capacity } C_1) \quad (4)$$

The smaller value of safety effect means that the battery is safe with a remote possibility of overcharging.

For evaluation of the initial discharge capacity S$_1$, the battery prepared in the same way as above was charged at 1 A up to 4.2 V and then discharged at room temperature under the same conditions as mentioned above. The battery was charged again under the same conditions. The charged battery was allowed to stand at 60° C. for 10 days. After cooling to room temperature, the battery was discharged at 1 A. The battery was charged and discharged again and the recovered capacity was measured. The capacity after storage is designated as S$_2$. The storage characteristic was evaluated according to the formula (5) below.

$$\text{Storage characteristic } (\%) = (\text{Recovered discharge capacity after storage } S_2)/(\text{Initial discharge capacity } S_1) \times 100 \quad (5)$$

The battery in Comparative Example 1 has a storage characteristic of 93%. The larger is this value, the better is the storage characteristic of the battery.

COMPARATIVE EXAMPLE 2

A cobalt-based battery was produced in the same way as in Comparative Example 1 except that the electrolytic solution (1M LiPF$_6$ EC/DMC (1/2 by volume)) contains 0.1 M of anisole (An for short hereinafter) dissolved therein. The resulting battery had an overcharging capacity of 1120 mAh and a safety effect (ξ) of 0.81. However, it had a storage characteristic of 72%, which is lower than that of the battery in Comparative Example 1.

EXAMPLE 1

An electrolytic solution was prepared from 1M LiPF$_6$ EC/DMC (1/2 by volume), 5 vol % of methyl perfluorobutyrate (HFE1 for short hereinafter) as a fluorinated solvent, and 0.1 M of An. This electrolytic solution was used to produce the same cobalt-based battery as in Comparative Example 1. The resulting battery had a charging capacity (up to 4.2 V) of 1395 mAh, but it had an overcharging capacity of 870 mAh. Therefore, the safety effect (ξ) of the battery was 0.62. This result indicates that the battery containing a specific fluorinated solvent (HFE1) in the electrolytic solution decreases in overcharge current capacity much more than that in Comparative Examples 1 and 2 even though An as an overcharge inhibiting agent is used in common. Moreover, the battery in this example had a storage characteristic of 82%, which is higher by 10% than that in Comparative Example 2.

EXAMPLE 2

An electrolytic solution was prepared from 1M $LiPF_6$ EC/DMC (1/2 by volume), 5 vol % of 2,2,3,3,3-tetrafluoropropyl difluoromethyl ether (HFE2 for short hereinafter) as a fluorinated solvent, and 0.1 M of An. This electrolytic solution was used to produce the same cobalt-based battery as in Comparative Example 1. The resulting battery had a charging capacity (up to 4.2 V) of 1410 mAh, but it had an overcharging capacity of 820 mAh. Therefore, the safety effect (ξ) of the battery was 0.58 (which is better than that in Example 1). This result indicates that the fluorinated solvent of ether structure added to the electrolytic solution improves further the effect of inhibiting overcharging. Moreover, the battery in this example had a storage characteristic of 86%, which is higher by 4% than that in Example 1. This suggests that the fluorinated solvent of ether structure also contributes to the storage characteristics.

EXAMPLE 3

An electrolytic solution was prepared from 1M $LiPF_6$ EC/DMC (1/2 by volume), 5 vol % of nanofluorobutyl methyl ether (HFE3 for short hereinafter) as a fluorinated solvent, and 0.1 M of An. This electrolytic solution was used to produce the same cobalt-based battery as in Comparative Example 1. The resulting battery had a charging capacity (up to 4.2 V) of 1390 mAh, but it had an overcharging capacity of 810 mAh. Therefore, the safety effect (ξ) of the battery was 0.58. This result indicates that the fluorinated solvent of ether structure produces the effect of inhibiting overcharging. Moreover, the battery in this example had a storage characteristic of 88%, which is higher by 2% than that in Example 1. This suggests that the nanofluorobutyl methyl ether greatly improves the storage characteristics.

COMPARATIVE EXAMPLE 3

A manganese-based battery was prepared in the same way as in Comparative Example 1 except that the anode active material was lithium manganate and the cathode active material was amorphous carbon (PIC from Kureha Chemical Industry Co., Ltd.), with the electrolytic solution remaining unchanged from 1M $LiPF_6$ EC/DMC (1/2 by volume). The resulting battery was measured for capacity by charging under the same condition ($V_1$=4.2 V) as in Comparative Example 1. The battery was found to have a charging capacity of 920 mAh and an overcharging capacity of 850 mAh at 4.2 V and above. Therefore, the safety effect (ξ) of the battery was 0.94, and the storage characteristic of the battery was 94%.

COMPARATIVE EXAMPLE 4

A manganese-based battery was prepared in the same way as in Comparative Example 3 except that the electrolytic solution was replaced by the one consisting of 1M $LiPF_6$ EC/DMC (1/2 by volume) and 0.1M of An dissolved therein. The resulting battery was found to have a charging capacity of 910 mAh (up to 4.2 V) and an overcharging capacity of 720 mAh. Therefore, the safety effect (ξ) of the battery was 0.79, which means that the battery has better safety than that in Comparative Example 3. However, the storage characteristic of the battery was 67%, which is lower than that of the battery in Comparative Example 3.

EXAMPLE 4

A manganese-based battery was prepared which contains an electrolytic solution consisting of 1M $LiPF_6$ EC/DMC (1/2 by volume), 0.1M of An, and 5 vol % of HFE1. The resulting battery was found to have a charging capacity of 920 mAh (up to 4.2 V) and an overcharging capacity of 640 mAh. Therefore, the safety effect (ξ) of the battery was 0.70, which means that the battery has better safety than that in Comparative Example 4. Moreover, the storage characteristic of the battery was 72%, which is better than that of the battery in Comparative Example 4. This result suggests that the fluorinated solvent prevents the overcharging inhibiting agent (An) from lowering the storage characteristics even in the case of manganese-based battery.

EXAMPLE 5

A manganese-based battery was prepared which contains an electrolytic solution consisting of 1M $LiPF_6$ EC/DMC (1/2 by volume), 0.1M of An, and 5 vol % of HFE2. The resulting battery was found to have a charging capacity of 930 mAh (up to 4.2 V) and an overcharging capacity of 590 mAh. Therefore, the safety effect (ξ) of the battery was 0.63, which means that the battery has better safety than that in Example 4. Moreover, the storage characteristic of the battery was 81%, which is better than that of the battery in Example 4. This result suggests that the fluorinated solvent of ether structure prevents the overcharging inhibiting agent from lowering the storage characteristics even in the case of manganese-based battery.

EXAMPLE 6

A manganese-based battery was prepared which contains an electrolytic solution consisting of 1M $LiPF_6$ EC/DMC (1/2 by volume), 0.1M of 4-biphenyl benzoate (Bph for short hereinafter), and 5 vol % of HFE2. The resulting battery was found to have a charging capacity of 910 mAh (up to 4.2 V) and an overcharging capacity of 550 mAh. Therefore, the safety effect (ξ) of the battery was 0.60, which means that the battery has better safety than that in Example 4. In addition, the storage characteristic of the battery was 83%. This result suggests that the Bph does not greatly decrease the storage characteristics unlike the battery in Comparative Example 4.

EXAMPLE 7

A manganese-based battery was prepared which contains an electrolytic solution consisting of 1M $LiPF_6$ EC/DMC (1/2 by volume), 0.1M of 1,2-dimethoxybenzene (VL for short hereinafter), and 5 vol % of HFE2. The resulting battery was found to have a charging capacity of 910 mAh (up to 4.2 V) and an overcharging capacity of 580 mAh. Therefore, the safety effect (ξ) of the battery was 0.64, which means that the battery has better safety than that in Example 4. In addition, the storage characteristic of the battery was 81%. This result suggests that the VL does not greatly decrease the storage characteristics unlike the battery in Comparative Example 4.

EXAMPLE 8

A manganese-based battery was prepared which contains an electrolytic solution consisting of 1M LiPF$_6$ EC/DMC (1/2 by volume), 0.1M of 4-fluoroanisole (FAn for short hereinafter), and 5 vol % of HFE2. The resulting battery was found to have a charging capacity of 920 mAh (up to 4.2 V) and an overcharging capacity of 530 mAh. Therefore, the safety effect ($\xi$) of the battery was 0.58, which means that the battery has better safety than that in Example 4. In addition, the storage characteristic of the battery was 83%. This result suggests that the FAn does not greatly decrease the storage characteristics unlike the battery in Comparative Example 4.

EXAMPLE 9

A manganese-based battery was prepared which contains an electrolytic solution consisting of 1M LiPF$_6$ EC/DMC (1/2 by volume), 0.1M of 2,5-diphenylanisole (DFAn for short hereinafter), and 5 vol % of HFE2. The resulting battery was found to have a charging capacity of 910 mAh (up to 4.2 V) and an overcharging capacity of 510 mAh. Therefore, the safety effect ($\xi$) of the battery was 0.56, which means that the battery has better safety than that in Example 4. In addition, the storage characteristic of the battery was 81%. This result suggests that the DFAn does not greatly decrease the storage characteristics unlike the battery in Comparative Example 4.

EXAMPLE 10

A manganese-based battery was prepared which contains an electrolytic solution consisting of 1M LiPF$_6$ EC/DMC (1/2 by volume), 0.1M of 4-biphenylacetate (BphA for short hereinafter), and 5 vol % of HFE2. The resulting battery was found to have a charging capacity of 900 mAh (up to 4.2 V) and an overcharging capacity of 510 mAh. Therefore, the safety effect ($\xi$) of the battery was 0.57, which means that the battery has better safety than that in Example 4. In addition, the storage characteristic of the battery was 83%. This result suggests that the BphA does not greatly decrease the storage characteristics unlike the battery in Comparative Example 4.

EXAMPLE 11

A manganese-based battery was prepared which contains an electrolytic solution consisting of 1M LiPF$_6$ EC/DMC (1/2 by volume), 0.1M of phenyl propionate (PhP for short hereinafter), and 5 vol % of HFE2. The resulting battery was found to have a charging capacity of 900 mAh (up to 4.2 V) and an overcharging capacity of 520 mAh. Therefore, the safety effect ($\xi$) of the battery was 0.58, which means that the battery has better safety than that in Example 4. In addition, the storage characteristic of the battery was 82%. This result suggests that the PhP does not greatly decrease the storage characteristics unlike the battery in Comparative Example 4.

EXAMPLE 12

A manganese-based battery was prepared which contains an electrolytic solution consisting of 1M LiPF$_6$ EC/DMC (1/2 by volume), 0.1M of ethoxybenzene (EtOB for short hereinafter), and 5 vol % of HFE2. The resulting battery was found to have a charging capacity of 910 mAh (up to 4.2 V) and an overcharging capacity of 570 mAh. Therefore, the safety effect ($\xi$) of the battery was 0.63, which means that the battery has better safety than that in Example 4. In addition, the storage characteristic of the battery was 81%. This result suggests that the EtOB does not greatly decrease the storage characteristics unlike the battery in Comparative Example 4.

EXAMPLE 13

A manganese-based battery was prepared which contains an electrolytic solution consisting of 1M LiPF$_6$ EC/DMC (1/2 by volume), 0.1M of 4-bromoanisole (BrAn for short hereinafter), and 5 vol % of HFE2. The resulting battery was found to have a charging capacity of 920 mAh (up to 4.2 V) and an overcharging capacity of 560 mAh. Therefore, the safety effect ($\xi$) of the battery was 0.61, which means that the battery has better safety than that in Example 4. In addition, the storage characteristic of the battery was 81%. This result suggests that the BrAn does not greatly decrease the storage characteristics unlike the battery in Comparative Example 4.

The above-mentioned results are summarized in Table 1. As mentioned above, the combination of an aromatic compound and a fluorinated solvent produces the effect of inhibiting overcharging for both the cobalt/graphite carbon battery and the manganese/amorphous carbon battery and gives rise to batteries which decrease in capacity only a little during storage. In addition, it was found that the aromatic compound known as an overcharge inhibiting agent has its effect enhanced when used in combination with a fluorinated solvent. Of several fluorinated solvents, that of ether structure is most effective.

TABLE 1

| Battery type Example No. | Electrolytic solution | Charging capacity (mAh) | Over-charging capacity (mAh) | Safety effect ($\xi$) | Storage characteristic (%) |
|---|---|---|---|---|---|
| LiCoO$_2$/graphite carbon | | | | | |
| Comparative Example 1 | 1M LiPF$_6$ EC/DMC = 1/2 | 1380 | 1300 | 0.94 | 93 |

TABLE 1-continued

| Battery type Example No. | Electrolytic solution | Charging capacity (mAh) | Over-charging capacity (mAh) | Safety effect (ξ) | Storage characteristic (%) |
|---|---|---|---|---|---|
| Comparative Example 2 | 1M LiPF$_6$ EC/DMC = 1/2, An = 0.1M | 1390 | 1120 | 0.81 | 72 |
| Example 1 | 1M LiPF$_6$ EC/DMC = 1/2, HFE1 = 5% + An = 0.1M | 1395 | 870 | 0.62 | 82 |
| Example 2 | 1M LiPF$_6$ EC/DMC = 1/2, HFE2 = 5% + An = 0.1M | 1410 | 820 | 0.58 | 86 |
| Example 3 | 1M LiPF$_6$ EC/DMC = 1/2, HFE3 = 5% + An = 0.1M | 1390 | 810 | 0.58 | 88 |
| LiMn$_2$O$_4$/ amorphous carbon | | | | | |
| Comparative Example 3 | 1M LiPF$_6$ EC/DMC = 1/2 | 920 | 850 | 0.92 | 94 |
| Comparative Example 4 | 1M LiPF$_6$ EC/DMC = 1/2, An = 0.1M | 910 | 720 | 0.79 | 67 |
| Example 4 | 1M LiPF$_6$ EC/DMC = 1/2, HFE1 = 5% + An = 0.1M | 920 | 640 | 0.70 | 72 |
| Example 5 | 1M LiPF$_6$ EC/DMC = 1/2, HFE2 = 5% + An = 0.1M | 930 | 590 | 0.63 | 81 |
| Example 6 | 1M LiPF$_6$ EC/DMC = 1/2, HFE2 = 5% + Bph = 0.1M | 910 | 550 | 0.60 | 83 |
| Example 7 | 1M LiPF$_6$ EC/DMC = 1/2, HFE2 = 5% + VL = 0.1M | 910 | 580 | 0.64 | 81 |
| Example 8 | 1M LiPF$_6$ EC/DMC = 1/2, HFE2 = 5% + FAn = 0.1M | 920 | 530 | 0.58 | 83 |
| Example 9 | 1M LiPF$_6$ EC/DMC = 1/2, HFE2 = 5% + DFAn = 0.1M | 910 | 510 | 0.56 | 81 |
| Example 10 | 1M LiPF$_6$ EC/DMC = 1/2, HFE2 = 5% + BphA = 0.1M | 900 | 510 | 0.57 | 83 |
| Example 11 | 1M LiPF$_6$ EC/DMC = 1/2, HFE2 = 5% + PhP = 0.1M | 900 | 520 | 0.58 | 82 |
| Example 12 | 1M LiPF$_6$ EC/DMC = 1/2, HFE2 = 5% + EtOB = 0.1M | 910 | 570 | 0.63 | 81 |
| Example 13 | 1M LiPF$_6$ EC/DMC = 1/2, HFE2 = 5% + BrAn = 0.1M | 920 | 560 | 0.61 | 81 |

EXAMPLE 14

A manganese-based battery was prepared which contains an electrolytic solution consisting of 1M LiPF$_6$ EC/DMC (1/2 by volume), 0.1M of An, and 5 vol % of HFE3. The resulting battery was found to have a charging capacity of 920 mAh (up to 4.2 V) and an overcharging capacity of 560 mAh. Therefore, the safety effect (ξ) of the battery was 0.61, which means that owing to HFE3 as a fluorinated solvent the battery has better safety than that in Examples 4 and 5 which employs HFE1 or HFE2 as a fluorinated solvent. In addition, the storage characteristic of the battery was 85%. Thus the battery in this example is greatly improved over that in Example 4 or 5. This result suggests that an adequate selection of fluorinated solvents contributes to improvement in safety and storage properties.

EXAMPLE 15

A manganese-based battery was prepared which contains an electrolytic solution consisting of 1M LiPF$_6$ EC/DMC (1/2 by volume), 0.1M of PhP, and 5 vol % of HFE3. The resulting battery was found to have a charging capacity of 900 mAh (up to 4.2 V) and an overcharging capacity of 520 mAh. Therefore, the safety effect (ξ) of the battery was 0.58. This result suggests that PhP as an overcharge inhibiting agent contributes more to the battery safety when used in combination with HFE3 as a fluorinated solvent than when used in combination with HFE2 as a fluorinate solvent, as in Example 12. In addition, the storage characteristic of the battery in this example is 85%, which is much better than that in Example 11. Thus it was confirmed in this example that HFE3 produces its good effect even though the kind of the overcharge inhibiting agent is changed.

EXAMPLE 16

A manganese-based battery was prepared which contains an electrolytic solution consisting of 1M LiPF$_6$ EC/DMC (1/2 by volume), 0.1M of EtOB, and 5 vol % of HFE3. The resulting battery was found to have a charging capacity of 910 mAh (up to 4.2 V) and an overcharging capacity of 570 mAh. Therefore, the safety effect (ξ) of the battery was 0.63. This result suggests that EtOB as an overcharge inhibiting agent contributes more to the battery safety when used in combination with HFE3 as a fluorinated solvent than when used in combination with HFE2 as a fluorinate solvent, as in Example 12. In addition, the storage characteristic of the battery in this example is 86%, which is much better than that in Example 12. Thus it was confirmed in this example that HFE3 produces its good effect even though the kind of the overcharge inhibiting agent is changed.

The following examples demonstrate how the battery safety and storage characteristics vary depending on the main solvent of the electrolytic solution and the kind of the electrolyte.

EXAMPLE 17

In this example, DMC was replaced by ethyl methyl carbonate (EMC for short hereinafter). A manganese-based battery was prepared which contains an electrolytic solution consisting of 1M LiPF$_6$ EC/EMC (1/2 by volume), 0.1M of An, and 5 vol % of HFE3. The resulting battery was found to have a charging capacity of 920 mAh (up to 4.2 V) and an overcharging capacity of 560 mAh. Therefore, the safety effect (ξ) of the battery was 0.60, which is equal to that of the battery in Example 14 which employs DMC as the solvent. The storage characteristic of the battery was 85%, which is equal to that of the battery which employs DMC as the solvent. This result suggests that EMC is as effective as DMC in safety and storage characteristics.

EXAMPLE 18

In this example, DMC was replaced by diethyl carbonate (DEC for short hereinafter). A manganese-based battery was prepared which contains an electrolytic solution consisting of 1M LiPF$_6$ EC/DEC (1/2 by volume), 0.1M of An, and 5 vol % of HFE3. The resulting battery was found to have a charging capacity of 900 mAh (up to 4.2 V) and an overcharging capacity of 520 mAh. Therefore, the safety effect ($\xi$) of the battery was 0.58, which is equal to that of the battery in Example 17 which employs EMC as the solvent. The storage characteristic of the battery was 84%, which is slightly inferior to that of the battery which employs DMC or EMC as the solvent but is superior to that of the battery in Example 5. This result suggests that the performance of the battery depends little on the solvent of the electrolytic solution.

EXAMPLE 19

A manganese-based battery was prepared which contains an electrolytic solution consisting of 1M LiPF$_6$ PC (propylene carbonate), 0.1M of An, and 0.5 vol % of HFE3. The resulting battery was found to have a charging capacity of 890 mAh (up to 4.2 V) and an overcharging capacity of 490 mAh. Therefore, the safety effect ($\xi$) of the battery was 0.55. This result suggests that PC used alone for the electrolytic solution produces a better result than 1M LiPF$_6$ EC/DMC (1/2 by volume) used in Example 14. The storage characteristic of the battery was 86%, which is better than that of the battery in Example 14.

EXAMPLE 20

A manganese-based battery was prepared which contains an electrolytic solution consisting of 1M LiPF$_6$ GBL (?-butyrolactone), 0.1M of An, and 0.5 vol % of HFE3. The resulting battery was found to have a charging capacity of 870 mAh (up to 4.2 V) and an overcharging capacity of 490 mAh. Therefore, the safety effect ($\xi$) of the battery was 0.55. This result suggests that the battery in this example which employs GBL-alone for the electrolytic solution is superior to that in Example 14. The storage characteristic of the battery was 88%, which is better than that of the battery in Example 14.

EXAMPLE 21

In this example, the lithium salt was replaced by LiBF$_4$. A manganese-based battery was prepared which contains an electrolytic solution consisting of 1M LiBF$_4$ PC, 0.1M of An, and 0.5 vol % of HFE3. The resulting battery was found to have a charging capacity of 890 mAh (up to 4.2 V) and an overcharging capacity of 480 mAh. Therefore, the safety effect ($\xi$) of the battery was 0.54, which is better than that of the battery in Example 19. The storage characteristic of the battery was 87%, which is better than that of the battery in Example 19. This result suggests that in the case of a solvent consisting of PC alone, the electrolytic solution containing LiBF$_4$ is superior to that containing LiPF$_6$.

EXAMPLE 22

A manganese-based battery was prepared which contains an electrolytic solution consisting of 1M LiBF$_4$ GBL, 0.1M of An, and 0.5 vol % of HFE3. The resulting battery was found to have a charging capacity of 890 mAh (up to 4.2 V) and an overcharging capacity of 480 mAh. Therefore, the safety effect ($\xi$) of the battery was 0.54, which is better than that of the battery in Example 19. The storage characteristic of the battery was 87%, which is better than that of the battery in Example 19. This result suggests that in the case of a solvent consisting of PC alone, the electrolytic solution containing LiBF$_4$ is superior to that containing LiPF$_6$.

EXAMPLE 23

A manganese-based battery was prepared which contains an electrolytic solution consisting of 1M LiBF$_4$ EC/GBUPC (1/1/1 by volume), 0.1M of An, and 0.5 vol % of HFE3. The resulting battery was found to have a charging capacity of 910 mAh (up to 4.2 V) and an overcharging capacity of 480 mAh. Therefore, the safety effect ($\xi$) of the battery was 0.53, which is better than that of the battery in Example 22. The storage characteristic of the battery was 89%, which is better than that of the battery in Example 22. This result suggests that the three-component solvent for the electrolytic solution also improves the safety and storage characteristics.

EXAMPLE 24

A manganese-based battery was prepared which contains an electrolytic solution consisting of 0.8M LiN(SO$_2$CF$_2$CF$_3$) (LiBETI for short hereinafter) and 0.2M LiBF$_4$ dissolved in BGL, 0.1M of An, and 0.5 vol % of HFE3. The resulting battery was found to have a charging capacity of 930 mAh (up to 4.2 V) and an overcharging capacity of 490 mAh. Therefore, the safety effect ($\xi$) of the battery was 0.53, which is better than that of the battery in Example 23. The storage characteristic of the battery was 87%.

EXAMPLE 25

A manganese-based battery was prepared which contains an electrolytic solution consisting of 0.2M LiPF$_6$ and 0.8M LiBF$_4$ dissolved in BGL, 0.1M of An, and 0.5 vol % of HFE3. The resulting battery was found to have a charging capacity of 940 mAh (up to 4.2 V) and an overcharging capacity of 490 mAh. Therefore, the safety effect ($\xi$) of the battery was 0.52, which is better than that of the battery in Example 23. The storage characteristic of the battery was 88%. This result suggests that a mixture of lithium salts tends to increase the charging capacity although its effect of improving the safety and storage characteristics remains almost unchanged.

The above-mentioned results are summarized in Table 2. As mentioned above, HFE3 as a fluorinated solvent improves the battery safety and storage characteristics more than HFE1 and HFE2. This holds true even when the composition of the electrolytic solution was changed.

TABLE 2

| Battery type Example No. | Electrolytic solution | Charging capacity (mAh) | Overcharging capacity (mAh) | Safety effect (ξ) | Storage characteristic (%) |
|---|---|---|---|---|---|
| $LiMn_2O_4$/ amorphous carbon | | | | | |
| Example 14 | 1M $LiPF_6$ EC/DMC = 1/2, HFE3 = 5% + An = 0.1M | 900 | 520 | 0.58 | 85 |
| Example 15 | 1M $LiPF_6$ EC/DMC = 1/2, HFE3 = 5% + PhP = 0.1M | 910 | 570 | 0.63 | 86 |
| Example 16 | 1M $LiPF_6$ EC/DMC = 1/2, HFE3 = 5% + EtOB = 0.1M | 920 | 560 | 0.61 | 85 |
| Example 17 | 1M $LiPF_6$ EC/EMC = 1/2, HFE3 = 5% + An = 0.1M | 920 | 550 | 0.60 | 86 |
| Example 18 | 1M $LiPF_6$ EC/DEC = 1/2, HFE3 = 5% + An = 0.1M | 900 | 520 | 0.58 | 84 |
| Example 19 | 1M $LiPF_6$ PC, HFE3 = 0.5% + An = 0.1M | 890 | 490 | 0.55 | 86 |
| Example 20 | 1M $LiPF_6$ GBL, HFE3 = 0.5% + An = 0.1M | 870 | 490 | 0.56 | 88 |
| Example 21 | 1M $LiBF_4$ PC, HFE3 = 0.5% + An = 0.1M | 890 | 480 | 0.54 | 87 |
| Example 22 | 1M $LiBF_4$ GBL, HFE3 = 0.5% + An = 0.1M | 880 | 470 | 0.53 | 88 |
| Example 23 | 1M $LiBF_4$ EC/GBL/PC = 1/5/1, HFE3 = 0.5% + An = 0.1M | 910 | 480 | 0.53 | 89 |
| Example 24 | 0.8M $LiBF_4$ 0.2M LiBETI GBL, HFE3 = 0.5% + An = 0.1M | 930 | 490 | 0.53 | 87 |
| Example 25 | 0.8M $LiBF_4$ 0.2M $LiPF_6$ GBL, HFE3 = 0.5% + An = 0.1M | 940 | 490 | 0.52 | 88 |

EXAMPLE 26

A manganese-based battery was prepared which contains an electrolytic solution consisting of 1M $LiPF_6$ EC/DMC (1/2 by volume), 0.1M of phenyltrimethylsilane (PS1 for short hereinafter), and 5 vol % of HFE3. The resulting battery was found to have a charging capacity of 900 mAh (up to 4.2 V) and an overcharging capacity of 450 mAh. Therefore, the safety effect (ξ) of the battery was 0.50, which is best among all the batteries obtained in the foregoing Examples. The storage characteristic of the battery was 91%, which is best among all the batteries obtained in the foregoing Examples. This result suggests that the silicon compound (with a silyl group) used as the overcharge inhibiting agent greatly improves the battery safety and storage characteristics.

EXAMPLE 27

A manganese-based battery was prepared which contains an electrolytic solution consisting of 1M $LiPF_6$ EC/DMC (1/2 by volume), 0.1M of diphenylmethylsilane (PS2 for short hereinafter), and 5 vol % of HFE3. The resulting battery was found to have a charging capacity of 910 mAh (up to 4.2 V) and an overcharging capacity of 430 mAh. Therefore, the safety effect (ξ) of the battery was 0.47, which is best among all the batteries obtained in the foregoing Examples. The storage characteristic of the battery was 92%, which is best among all the batteries obtained in the foregoing Examples.

EXAMPLE 28

A manganese-based battery was prepared which contains an electrolytic solution consisting of 1M $LiPF_6$ EC/DMC (1/2 by volume), 0.1M of diphenylsilane (PS3 for short hereinafter), and 5 vol % of HFE3. The resulting battery was found to have a charging capacity of 920 mAh (up to 4.2 V) and an overcharging capacity of 430 mAh. Therefore, the safety effect (ξ) of the battery was 0.47, which is equal to that of the battery in Example 27. The battery in this Example has an improved charge capacity. The storage characteristic of the battery was 93%, which is best among all the batteries obtained in the foregoing Examples.

EXAMPLE 29

A manganese-based battery was prepared which contains an electrolytic solution consisting of 1M $LiPF_6$ EC/DMC (1/2 by volume), 0.1M of diphenyldimethoxysilane (PS4 for short hereinafter), and 5 vol % of HFE3. The resulting battery was found to have a charging capacity of 920 mAh (up to 4.2 V) and an overcharging capacity of 420 mAh. Therefore, the safety effect (ξ) of the battery was 0.46, which is best among all the batteries obtained in the foregoing Examples. The storage characteristic of the battery was 93%, which is equal to that of the battery in Example 28.

EXAMPLE 30

A manganese-based battery was prepared which contains an electrolytic solution consisting of 1M $LiPF_6$ EC/DMC (1/2 by volume), 0.1M of 4-methoxyphenyltrimethylsilane (PS5 for short hereinafter), and 5 vol % of HFE3. The resulting battery was found to have a charging capacity of 920 mAh (up to 4.2 V) and an overcharging capacity of 410 mAh. Therefore, the safety effect (ξ) of the battery was 0.465, which is best among all the batteries obtained in the foregoing Examples. The storage characteristic of the battery was 93%, which is equal to that of the batteries in Examples 28 and 29.

EXAMPLE 31

A manganese-based battery was prepared which contains an electrolytic solution consisting of 1M $LiBF_4$ EC/DMC (1/2 by volume), 0.1M of PS5, and 5 vol % of HFE3. The resulting battery was found to have a charging capacity of 910 mAh (up to 4.2 V) and an overcharging capacity of 390 mAh. Therefore, the safety effect (ξ) of the battery was 0.43, which is best among all the batteries obtained in the foregoing Examples. The storage characteristic of the battery was 93%, which is equal to that of the batteries in Examples 28 to 30. The result remained unchanged even though the lithium salt was replaced by $LiBF_4$.

EXAMPLE 32

A manganese-based battery was prepared which contains an electrolytic solution consisting of 0.8M $LiPF_6$ 0.2M LiBETI EC/DMC (1/2 by volume), 0.1M of PS5, and 5 vol % of HFE3. The resulting battery was found to have a charging capacity of 920 mAh (up to 4.2 V) and an overcharging capacity of 410 mAh. Therefore, the safety effect (ξ) of the battery was 0.45, which is equal to that of the battery employing a compound having a silyl group. The storage characteristic of the battery was 94%, which is equal to that of the battery in Comparative Example 3.

EXAMPLE 33

A manganese-based battery was prepared which contains an electrolytic solution consisting of 0.8M $LiBF_4$ 0.2M LiBETI EC/DMC (1/2 by volume), 0.1M of PS5, and 5 vol % of HFE3. The resulting battery was found to have a charging capacity of 930 mAh (up to 4.2 V) and an overcharging capacity of 420 mAh. Therefore, the safety effect (ξ) of the battery was 0.45, which is equal to that of the battery in Example 32 which employs a mixture of lithium salts.

EXAMPLE 34

A manganese-based battery was prepared which contains an electrolytic solution consisting of 1M $LiBF_4$ PC, 0.1M of PS5, and 0.5 vol % of HFE3. The resulting battery was found to have a charging capacity of 900 mAh (up to 4.2 V) and an overcharging capacity of 430 mAh. Therefore, the safety effect (ξ) of the battery was 0.48 and the storage characteristic was 92%. This result suggests that even a single solvent greatly improves the battery safety and storage characteristics compared with the battery in Example 21.

EXAMPLE 35

A manganese-based battery was prepared which contains an electrolytic solution consisting of 1M $LiBF_4$ GBL, 0.1M of PS5, and 0.5 vol % of HFE3. The resulting battery was found to have a charging capacity of 910 mAh (up to 4.2 V) and an overcharging capacity of 420 mAh. Therefore, the safety effect (ξ) of the battery was 0.46 and the storage characteristic was 92%. The battery in this example is much better in safety and storage characteristics than the battery in Example 22.

EXAMPLE 36

A manganese-based battery was prepared which contains an electrolytic solution consisting of 1M $LiBF_4$ EC/PC (1/2 by volume), 0.1M of PS5, and 0.5 vol % of HFE3. The resulting battery was found to have a charging capacity of 910 mAh (up to 4.2 V) and an overcharging capacity of 400 mAh. Therefore, the safety effect (ξ) of the battery was 0.44, which is best among all the batteries obtained in the foregoing Examples. The storage characteristic of the battery was as high as 93%.

EXAMPLE 37

A manganese-based battery was prepared which contains an electrolytic solution consisting of 1M $LiBF_4$ EC/GBL/PC (1/1/1 by volume), 0.1M of PS5, and 0.5 vol % of HFE3. The resulting battery was found to have a charging capacity of 920 mAh (up to 4.2 V) and an overcharging capacity of 390 mAh. Therefore, the safety effect (ξ) of the battery was 0.42, which is best among all the batteries obtained in the foregoing Examples. The storage characteristic of the battery was 93%, which also best among all the batteries obtained in the foregoing Examples.

The above-mentioned results are summarized in Table 3. As mentioned above, the phenylsilane compound as an overcharge inhibiting agent and HFE3 as a fluorinated solvent improve the safety and storage characteristics for lithium secondary batteries varying in the composition of the electrolytic solution.

TABLE 3

| Battery type Example No. | Electrolytic solution | Charging capacity (mAh) | Overcharging capacity (mAh) | Safety effect (ξ) | Storage characteristic (%) |
|---|---|---|---|---|---|
| $LiMn_2O_4$/ amorphous carbon | | | | | |
| Example 26 | 1M $LiPF_6$ EC/DMC = 1/2, HFE3 = 5% + PS1 = 0.1M | 900 | 450 | 0.50 | 91 |
| Example 27 | 1M $LiPF_6$ EC/DMC = 1/2, HFE3 = 5% + PS2 = 0.1M | 910 | 430 | 0.47 | 92 |
| Example 28 | 1M $LiPF_6$ EC/DMC = 1/2, HFE3 = 5% + PS3 = 0.1M | 920 | 430 | 0.47 | 93 |
| Example 29 | 1M $LiPF_6$ EC/DMC = 1/2, HFE3 = 5% + PS4 = 0.1M | 920 | 420 | 0.46 | 93 |
| Example 30 | 1M $LiPF_6$ EC/DMC = 1/2, HFE3 = 5% + PS5 = 0.1M | 920 | 410 | 0.45 | 93 |
| Example 31 | 1M $LiBF_4$ EC/DMC = 1/2, HFE3 = 5% + PS5 = 0.1M | 910 | 390 | 0.43 | 93 |
| Example 32 | 0.8M $LiPF_6$ 0.2M LiBETI EC/EMC = 1/2, HFE3 = 5% + PS5 = 0.1M | 920 | 410 | 0.45 | 94 |
| Example 33 | 0.8M $LiBF_4$ 0.2M LiBETI EC/EMC = 1/2, HFE3 = 5% + PS5 = 0.1M | 930 | 420 | 0.45 | 94 |
| Example 34 | 1M $LiBF_4$ PC, HFE3 = 0.5% + PS5 = 0.1M | 900 | 430 | 0.48 | 92 |
| Example 35 | 1M $LiBF_4$ GBL, HFE3 = 0.5% + PS5 = 0.1M | 910 | 420 | 0.46 | 94 |
| Example 36 | 1M $LiBF_4$ EC/PC = 1/2, HFE3 = 0.5% + PS5 = 0.1M | 910 | 400 | 0.44 | 93 |
| Example 37 | 1M $LiBF_4$ EC/GBL/PC = 1/5/1, HFE3 = 0.5% + PS5 = 0.1M | 920 | 390 | 0.42 | 94 |

COMPARATIVE EXAMPLE 5

A battery of the same shape as in Comparative Example 4 was prepared in which the anode active material is $LiNi_{0.5}Mn_{1.5}O_4$ and the cathode active material is graphite carbon and the electrolytic solution is 1M $LiPF_6$ EC/DMC (1/2 by volume). This battery will be referred to as "5V-class Mn-graphite battery" hereinafter. This battery was charged under the condition of constant current and constant voltage ($V_1$) of 4.9 V. The charging voltage was set at 4.9 V because this battery has a high average discharge voltage. The current at the end of charging was 20 mA. The battery was discharged at a constant current of 1 A until the voltage decreased to 3.7 V. This charging and discharging cycle was repeated twice, and the charging capacity ($C_1$) and the overcharging capacity ($C_2$) were measured. It was found that the charging capacity ($C_1$) is 1100 mAh and the overcharging capacity ($C_2$) is 870 mAh and the safety effect ($\xi$) is 0.79. The storage characteristic is 89% (evaluated under the same condition as in Comparative Example 4).

EXAMPLE 38

A 5V-class Mn-graphite battery was prepared which contains an electrolytic solution consisting of 1M $LiBF_4$ EC/DMC (1/2 by volume), 0.1 M of An, and 5 vol % of HFE1. When evaluated under the same condition as in Comparative Example 5, the resulting battery was found to have a charging capacity of 1110 mAh and an overcharging capacity of 660 mAh. Therefore, the safety effect ($\xi$) of the battery was 0.6, which is lower by 0.19 than that of the battery in Comparative Example 5. The storage characteristic of the battery was 82%.

EXAMPLE 39

A 5V-class Mn-graphite battery was prepared which contains an electrolytic solution consisting of 1M $LiPF_6$ EC/DMC (1/2 by volume), 0.1 M of An, and 5 vol % of HFE2. When evaluated under the same condition as in Comparative Example 5, the resulting battery was found to have a charging capacity of 1110 mAh and an overcharging capacity of 650 mAh. Therefore, the safety effect ($\xi$) of the battery was 0.59, which is lower by 0.01 than that of the battery in Example 38. The storage characteristic of the battery was 83%, which is 1% higher than that of the battery in Example 38.

EXAMPLE 40

A 5V-class Mn-graphite battery was prepared which contains an electrolytic solution consisting of 1M $LiPF_6$ EC/DMC (1/2 by volume), 0.1 M of An, and 5 vol % of HFE3. When evaluated under the same condition as in Comparative Example 5, the resulting battery was found to have a charging capacity of 1120 mAh and an overcharging capacity of 630 mAh. Therefore, the safety effect ($\xi$) of the battery was 0.57, which is lower by 0.02 than that of the battery in Example 39. The storage characteristic of the battery was 85%, which is 2% higher than that of the battery in Example 39.

As mentioned above, the combined use of fluorinated solvent and overcharge inhibiting agent improves the safety effect and prevents the storage characteristics from decreasing also in the case of 5V-class Mn-graphite battery. In addition, ether-type fluorinated solvents are more effective than ester-type ones also in the case of 5V-class Mn-graphite battery.

EXAMPLE 41

A 5V-class Mn-graphite battery was prepared which contains an electrolytic solution consisting of 1M $LiPF_6$ EC/GBL (1/2 by volume), 0.1 M of An, and 1 vol % of HFE3. When evaluated under the same condition as in Comparative Example 5, the resulting battery was found to have a charging capacity of 1120 mAh and an overcharging capacity of 580 mAh. Therefore, the safety effect ($\xi$) of the battery was 0.52, which is lower by 0.05 than that of the battery in Example 40. The storage characteristic of the battery was 86%, which is 1% higher than that of the battery in Example 40. This result suggests that the battery is improved in safety effect and storage characteristic when the solvent for electrolytic solution is switched from DMC to GBL.

EXAMPLE 42

A 5V-class Mn-graphite battery was prepared which contains an electrolytic solution consisting of 1M $LiPF_6$ EC/GBL (1/2 by volume), 0.1 M of PS1, and 1 vol % of HFE3. When evaluated under the same condition as in Comparative Example 5, the resulting battery was found to have a charging capacity of 1120 mAh and an overcharging capacity of 550 mAh. Therefore, the safety effect ($\xi$) of the battery was 0.49, which is lower by 0.03 than that of the battery in Example 41. The storage characteristic of the battery was 87%, which is 1% higher than that of the battery in Example 41. This result suggests that PS1 (phenyltrimethylsilane) as the overcharge inhibiting agent contributes to safety and storage characteristic also in the case of 5V-class Mn-graphite battery.

EXAMPLE 43

A 5V-class Mn-graphite battery was prepared which contains an electrolytic solution consisting of 1M $LiPF_6$ EC/GBL (1/2 by volume), 0.1 M of PS2, and 1 vol % of HFE3. When evaluated under the same condition as in Comparative Example 5, the resulting battery was found to have a charging capacity of 1110 mAh and an overcharging capacity of 510 mAh. Therefore, the safety effect ($\xi$) of the battery was 0.45, which is lower by 0.03 than that of the battery in Example 42. The storage characteristic of the battery was 88%, which is 1% higher than that of the battery in Example 42.

EXAMPLE 44

A 5V-class Mn-graphite battery was prepared which contains an electrolytic solution consisting of 1M $LiPF_6$ EC/GBL (1/2 by volume), 0.1 M of PS3, and 1 vol % of HFE3. When evaluated under the same condition as in Comparative Example 5, the resulting battery was found to have a charging capacity of 1110 mAh and an overcharging capacity of 460 mAh. Therefore, the safety effect ($\xi$) of the battery was 0.41, which is lower by 0.05 than that of the battery in Example 43. The storage characteristic of the battery was 89%, which is equal to that of the battery in Comparative Example 5.

EXAMPLE 45

A 5V-class Mn-graphite battery was prepared which contains an electrolytic solution consisting of 1M $LiPF_6$ EC/GBL (1/2 by volume), 0.1 M of PS4, and 1 vol % of HFE3. When evaluated under the same condition as in Comparative Example 5, the resulting battery was found to have a charging capacity of 1120 mAh and an overcharging capacity of 450 mAh. Therefore, the safety effect ($\xi$) of the battery was 0.40, which is lower by 0.01 than that of the battery in Example 44. The storage characteristic of the battery was 89%, which is equal to that of the battery in Comparative Example 5.

EXAMPLE 46

A 5V-class Mn-graphite battery was prepared which contains an electrolytic solution consisting of 1M LiPF$_6$ EC/GBL (1/2 by volume), 0.1 M of PS5, and 1 vol % of HFE3. When evaluated under the same condition as in Comparative Example 5, the resulting battery was found to have a charging capacity of 1120 mAh and an overcharging capacity of 420 mAh. Therefore, the safety effect ($\xi$) of the battery was 0.38, which is lower by 0.02 than that of the battery in Example 45. The storage characteristic of the battery was 89%, which is equal to that of the battery in Comparative Example 5.

It is apparent from the foregoing results that the 5V-class Mn-graphite battery improves in safety and storage characteristic when PS1 (as the overcharge inhibiting agent) is replaced by any of PS2 (diphenylmethylsilane), PS3 (diphenylsilane), PS4 (diphenyldimethoxysilane), and PS5 (4-methoxyphenyltrimethylsilane).

HFE1. When evaluated under the same condition as in Comparative Example 6, the resulting battery was found to have a charging capacity of 950 mAh and an overcharging capacity of 660 mAh. Therefore, the safety effect ($\xi$) of the battery was 0.69, which is lower by 0.26 than that of the battery in Comparative Example 6. The storage characteristic of the battery was 81%.

EXAMPLE 48

A 5V-class Mn-amorphous battery was prepared which contains an electrolytic solution consisting of 1M LiPF$_6$ EC/DMC (1/2 by volume), 0.1 M of An, and 5 vol % of HFE2. When evaluated under the same condition as in Comparative Example 6, the resulting battery was found to have a charging capacity of 960 mAh and an overcharging capacity of 650 mAh. Therefore, the safety effect ($\xi$) of the battery was 0.67, which is lower by 0.02 than that of the

TABLE 4

| Battery type Example No. | Electrolytic solution | Charging capacity (mAh) | Overcharging capacity (mAh) | Safety effect ($\xi$) | Storage characteristic (%) |
|---|---|---|---|---|---|
| LiNi$_{0.5}$Mn$_{1.5}$O$_4$/graphte carbon | | | | | |
| Comparative Example 5 | 1M LiPF$_6$ EC/DMC = 1/2 | 1100 | 870 | 0.79 | 89 |
| Example 38 | 1M LiPF$_6$ EC/DMC = 1/2, HFE1 = 5% + An = 0.1M | 1110 | 660 | 0.60 | 82 |
| Example 39 | 1M LiPF$_6$ EC/DMC = 1/2, HFE2 = 5% + An = 0.1M | 1110 | 650 | 0.59 | 83 |
| Example 40 | 1M LiPF$_6$ EC/DMC = 1/2, HFE3 = 5% + An = 0.1M | 1120 | 630 | 0.57 | 85 |
| Example 41 | 1M LiPF$_6$ EC/GBL = 1/2, HFE3 = 1% + An = 0.1M | 1120 | 580 | 0.52 | 86 |
| Example 42 | 1M LiPF$_6$ EC/GBL = 1/2, HFE3 = 1% + PS1 = 0.1M | 1120 | 550 | 0.49 | 87 |
| Example 43 | 1M LiPF$_6$ EC/GBL = 1/2, HFE3 = 1% + PS2 = 0.1M | 1110 | 510 | 0.46 | 88 |
| Example 44 | 1M LiPF$_6$ EC/GBL = 1/2, HFE3 = 1% + PS3 = 0.1M | 1100 | 460 | 0.41 | 89 |
| Example 45 | 1M LiPF$_6$ EC/GBL = 1/2, HFE3 = 1% + PS4 = 0.1M | 1120 | 450 | 0.40 | 89 |
| Example 46 | 1M LiPF$_6$ EC/GBL = 1/2, HFE3 = 1% + PS5 = 0.1M | 1120 | 420 | 0.38 | 89 |

COMPARATIVE EXAMPLE 6

A battery of the same shape as in Comparative Example 4 was prepared in which the anode active material is LiNi$_{0.5}$Mn$_{1.5}$O$_4$ and the cathode active material is amorphous carbon and the electrolytic solution is 1M LiPF$_6$ EC/DMC (1/2 by volume). This battery will be referred to as "5V-class Mn-amorphous battery" hereinafter. This battery was charged under the condition of constant current and constant voltage (V$_1$) of 4.9 V. The charging voltage was set at 4.9 V because this battery has a high average discharge voltage. The current at the end of charging was 20 mA. The battery was discharged at a constant current of 1 A until the voltage decreased to 3.7 V. This charging and discharging cycle was repeated twice, and the charging capacity (C$_1$) and the overcharging capacity (C$_2$) were measured. It was found that the charging capacity (C$_1$) is 940 mAh and the overcharging capacity (C$_2$) is 890 mAh and the safety effect ($\xi$) is 0.95. The storage characteristic is 87% (evaluated under the same condition as in Comparative Example 5).

EXAMPLE 47

A 5V-class Mn-amorphous battery was prepared which contains an electrolytic solution consisting of 1M LiPF$_6$ EC/DMC (1/2 by volume), 0.1 M of An, and 5 vol % of battery in Example 47. The storage characteristic of the battery was 82%, which is higher by 1% than that of the battery in Example 47.

EXAMPLE 49

A 5V-class Mn-amorphous battery was prepared which contains an electrolytic solution consisting of 1M LiPF$_6$ EC/DMC (1/2 by volume), 0.1 M of An, and 5 vol % of HFE3. When evaluated under the same condition as in Comparative Example 6, the resulting battery was found to have a charging capacity of 960 mAh and an overcharging capacity of 630 mAh. Therefore, the safety effect ($\xi$) of the battery was 0.66, which is lower by 0.01 than that of the battery in Example 48. The storage characteristic of the battery was 84%, which is higher by 2% than that of the battery in Example 48.

As mentioned above, the combined use of fluorinated solvent and overcharge inhibiting agent improves the safety effect and prevents the storage characteristics from decreasing also in the case of 5V-class Mn-amorphous battery. In addition, ether-type fluorinated solvents are more effective than ester-type ones also in the case of 5V-class Mn-amorphous battery.

EXAMPLE 50

A 5V-class Mn-amorphous battery was prepared which contains an electrolytic solution consisting of 1M LiPF$_6$ EC/PC (1/2 by volume), 0.1 M of An, and 0.5 vol % of HFE3. When evaluated under the same condition as in Comparative Example 6, the resulting battery was found to have a charging capacity of 940 mAh and an overcharging capacity of 560 mAh. Therefore, the safety effect (ξ) of the battery was 0.60, which is lower by 0.06 than that of the battery in Example 49. The storage characteristic of the battery was 85%, which is higher by 1% than that of the battery in Example 49. This result suggests that the battery improves in safety and storage characteristic when the solvent for electrolytic solution is switched from DMC to PC.

EXAMPLE 51

A 5V-class Mn-amorphous battery was prepared which contains an electrolytic solution consisting of 1M LiPF$_6$ EC/PC (1/2 by volume), 0.1 M of PS1, and 0.5 vol % of HFE3. When evaluated under the same condition as in Comparative Example 6, the resulting battery was found to have a charging capacity of 950 mAh and an overcharging capacity of 520 mAh. Therefore, the safety effect (ξ) of the battery was 0.55, which is lower by 0.05 than that of the battery in Example 50. The storage characteristic—of the battery was 87%, which is higher by 2% than that of the battery in Example 50. This result suggests that the battery improves in safety and storage characteristic when phenylsilane is used as the overcharge inhibiting agent.

EXAMPLE 52

A 5V-class Mn-amorphous battery was prepared which contains an electrolytic solution consisting of 1M LiPF$_6$ EC/PC (1/2 by volume), 0.1 M of PS2, and 0.5 vol % of HFE3. When evaluated under the same condition as in Comparative Example 6, the resulting battery was found to have a charging capacity of 950 mAh and an overcharging capacity of 490 mAh. Therefore, the safety effect (ξ) of the battery was 0.52, which is lower by 0.03 than that of the battery in Example 51. The storage characteristic of the battery was 88%, which is higher by 1% than that of the battery in Example 51.

EXAMPLE 53

A 5V-class Mn-amorphous battery was prepared which contains an electrolytic solution consisting of 1M LiPF$_6$ EC/PC (1/2 by volume), 0.1 M of PS3, and 0.5 vol % of HFE3. When evaluated under the same condition as in Comparative Example 6, the resulting battery was found to have a charging capacity of 940 mAh and an overcharging capacity of 470 mAh. Therefore, the safety effect (ξ) of the battery was 0.50, which is lower by 0.02 than that of the battery in Example 52. The storage characteristic of the battery was 88%.

EXAMPLE 54

A 5V-class Mn-amorphous battery was prepared which contains an electrolytic solution consisting of 1M LiPF$_6$ EC/PC (1/2 by volume), 0.1 M of PS4, and 0.5 vol % of HFE3. When evaluated under the same condition as in Comparative Example 6, the resulting battery was found to have a charging capacity of 950 mAh and an overcharging capacity of 430 mAh. Therefore, the safety effect (ξ) of the battery was 0.45, which is lower by 0.05 than that of the battery in Example 53. The storage characteristic of the battery was 88%.

EXAMPLE 55

A 5V-class Mn-amorphous battery was prepared which contains an electrolytic solution consisting of 1M LiPF$_6$ EC/PC (1/2 by volume), 0.1 M of PS5, and 0.5 vol % of HFE3. When evaluated under the same condition as in Comparative Example 6, the resulting battery was found to have a charging capacity of 1120 mAh and an overcharging capacity of 420 mAh. Therefore, the safety effect (ξ) of the battery was 0.44, which is lower by 0.01 than that of the battery in Example 54. The storage characteristic of the battery was 88%.

It is apparent from the foregoing results that the 5V-class Mn-amorphous battery improves in safety and storage characteristic when PS1 (as the overcharge inhibiting agent) is replaced by any of PS2 (diphenylmethyl-silane), PS3 (diphenylsilane), PS4 (diphenyldimethoxysilane), and PS5 (4-methoxyphenyltrimethylsilane).

TABLE 5

| Battery type Example No. | Electrolytic solution | Charging capacity (mAh) | Overcharging capacity (mAh) | Safety effect (ξ) | Storage characteristic (%) |
|---|---|---|---|---|---|
| LiNi$_{0.5}$Mn$_{1.5}$O$_4$/amorphous carbon | | | | | |
| Comparative Example 6 | 1M LiPF$_6$ EC/DMC = 1/2 | 940 | 890 | 0.95 | 87 |
| Example 47 | 1M LiPF$_6$ EC/DMC = 1/2, HFE1 = 5% + An = 0.1M | 950 | 660 | 0.69 | 81 |
| Example 48 | 1M LiPF$_6$ EC/DMC = 1/2, HFE2 = 5% + An = 0.1M | 960 | 650 | 0.67 | 82 |
| Example 49 | 1M LiPF$_6$ EC/DMC = 1/2, HFE3 = 5% + An = 0.1M | 930 | 630 | 0.68 | 84 |
| Example 50 | 1M LiPF$_6$ EC/PC = 1/2, HFE3 = 0.5% + An = 0.1M | 940 | 560 | 0.60 | 85 |
| Example 51 | 1M LiPF$_6$ EC/PC = 1/2, HFE3 = 0.5% + PS1 = 0.1M | 950 | 520 | 0.55 | 87 |
| Example 52 | 1M LiPF$_6$ EC/PC = 1/2, HFE3 = 0.5% + PS2 = 0.1M | 950 | 490 | 0.52 | 88 |
| Example 53 | 1M LiPF$_6$ EC/PC = 1/2, HFE3 = 0.5% + PS3 = 0.1M | 940 | 470 | 0.50 | 88 |
| Example 54 | 1M LiPF$_6$ EC/PC = 1/2, HFE3 = 0.5% + PS4 = 0.1M | 950 | 430 | 0.45 | 88 |
| Example 55 | 1M LiPF$_6$ EC/PC = 1/2, HFE3 = 0.5% + PS5 = 0.1M | 940 | 410 | 0.44 | 88 |

It has been demonstrated by Examples in the foregoing that the combined use of an overcharge inhibiting agent and a fluorinated solvent protects the lithium secondary battery from overcharging. (The fluorinated solvent enhances the action of the overcharge inhibiting agent and prevents the adverse effect of the fluorinated solvent on the storage characteristics.) The lithium secondary battery according to the present invention has a lower overcharge current than the conventional one by more than 20%. Therefore, it can be increased in capacity with safety. The first commercialized lithium secondary battery had a capacity of 1000 mAh; the capacity has increased to 2000 mAh since then. The increase in capacity is accompanied by danger. Assuming a safety effect of 0.9, the battery with a capacity of 1000 mAh has an energy of 17.1 kJ if overcharged up to 5V, whereas the battery with a capacity of 2000 mAh has an energy of 34.2 kJ if overcharged up to 5V. In other words, the latter battery has twice as much energy as the former battery. By contrast, the battery according to the present invention has a safety effect of, say, 0.6 and hence it has an energy of 28.8 kj in its overcharged state even though it has a capacity of 2000 mAh. The magnitude of this energy is 1.68 times that of the battery with a capacity of 1000 mAh. In other words, if the safety effect is set at 0.6, the battery with an overcharge capacity of 2400 mAh will have the same energy of the conventional battery with an overcharge capacity of 2000 mAh which has a safety effect of 0.9. Thus according to the present invention, it is possible to increase the capacity of lithium batteries without impairing safety. Also, the present invention can be utilized in any electrical appliance as well. Note, an electrical appliance is defined to include any electrical object capable of utilizing a lithium secondary battery.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

The invention claimed is:

1. A lithium secondary battery comprising a nonaqueous electrolytic solution containing a compound which is oxidized at a voltage higher than a charge end voltage of the lithium secondary battery and a compound which inhibits reactions at voltages lower than said charge end voltage.

2. The lithium secondary battery of claim 1 wherein said nonaqueous electrolytic solution is composed of a fluorinated solvent represented by the chemical formula (1) and an aromatic compound represented by the chemical formula (2) below

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

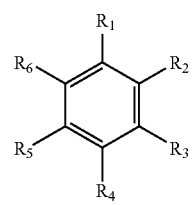

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

3. The lithium secondary battery according to claim 2 wherein the fluorinated solvent is methyl nanofluorobutyl ether.

4. The lithium secondary battery according to claim 2 wherein the aromatic compound is a phenylsilane derivative represented by the chemical formula (3) below

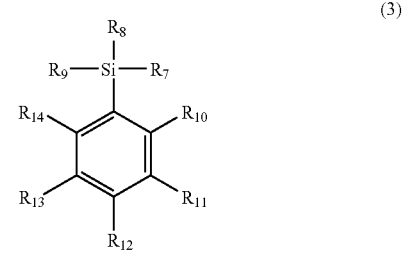

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

5. The lithium secondary battery according to claim 4 wherein said phenylsilane derivative is selected from the group comprising diphenylsilane, diphenylmethylsilane, 4-methylpheyltrimethylsilane, and diphenyldimethoxysilane.

6. A lithium secondary battery having a nonaqueous electrolytic solution characterized in that the lithium secondary battery has a charge capacity of $C_1$ when it (in discharged state) is charged with constant current until a voltage $V_1$ of 1.2V is reached and the lithium secondary battery has a charge capacity of $C_2$ when it is charged further (at a voltage higher than $V_1$) until it cannot be charged any longer, with the ratio (ξ) of $C_1/C_2$ being lower than 0.7.

7. The lithium secondary battery of claim 6 wherein said nonaqueous electrolytic solution is composed of a fluorinated solvent represented by the chemical formula (1) and an aromatic compound represented by the chemical formula (2) below

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

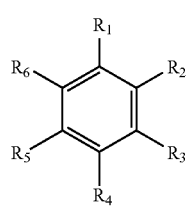

(2)

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

8. The lithium secondary battery according to claim 7 wherein the fluorinated solvent is methyl nanofluorobutyl ether.

9. The lithium secondary battery according to claim 7 wherein the aromatic compound is a phenylsilane derivative represented by the chemical formula (3) below

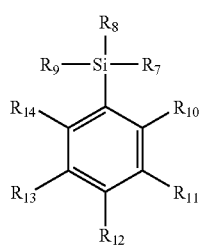

(3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

10. The lithium secondary battery according to claim 9 wherein said phenylsilane derivative is selected from the group comprising diphenylsilane, diphenylmethylsilane, 4-methylpheyltrimethylsilane, and diphenyldimethoxysilane.

11. A lithium secondary battery comprising a nonaqueous electrolytic solution containing a compound which is oxidized at a voltage higher than a charge end voltage of the lithium secondary battery and a compound which inhibits reactions at voltages lower than said charge end voltage wherein said nonaqueous electrolytic solution is composed of a fluorinated solvent represented by the chemical formula (1) and an aromatic compound represented by the chemical formula (2) below $$Rf_1\text{-}X\text{-}Rf_2 \qquad (1)$$

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

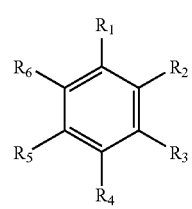

(2)

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

12. The lithium secondary battery according to claim 11 wherein the fluorinated solvent is methyl nanofluorobutyl ether.

13. The lithium secondary battery according to claim 11 wherein the aromatic compound is a phenylsilane derivative represented by the chemical formula (3) below

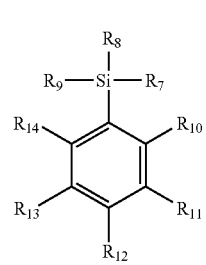

(3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

14. The lithium secondary battery according to claim 13 wherein said phenylsilane derivative is selected from the group comprising diphenylsilane, diphenylmethylsilane, 4-methylpheyltrimethylsilane, and diphenyldimethoxysilane.

15. A lithium secondary battery having a nonaqueous electrolytic solution characterized in that the lithium secondary battery has a charge capacity of $C_1$ when it (in discharged state) is charged with constant current until a voltage $V_1$ of 1.2V is reached and the lithium secondary battery has a charge capacity of $C_2$ when it is charged further (at a voltage higher than $V_1$) until it cannot be charged any longer, with the ratio ($\xi$) of $C_1/C_2$ being lower than 0.7 and wherein said nonaqueous electrolytic solution is composed of a fluorinated solvent represented by the chemical formula (1) and an aromatic compound represented by the chemical formula (2) below $$Rf_1\text{-}X\text{-}Rf_2 \qquad (1)$$

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

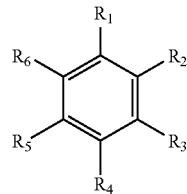

(2)

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

16. The lithium secondary battery according to claim 15 wherein the fluorinated solvent is methyl nanofluorobutyl ether.

17. The lithium secondary battery according to claim 15 wherein the aromatic compound is a phenylsilane derivative represented by the chemical formula (3) below

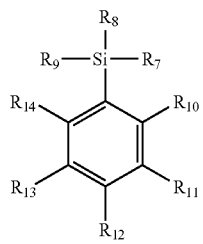

(3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

18. The lithium secondary battery according to claim 17 wherein said phenylsilane derivative is selected from the group comprising diphenylsilane, diphenylmethylsilane, 4-methylpheyltrimethylsilane, and diphenyldimethoxysilane.

19. An electrical appliance using a lithium secondary battery as a power source which comprises a means for protecting the lithium secondary batteries from overcharging and overdischarging being free from temperature and pressure detection of the batteries, a means for detecting voltages or current of the batteries and a means for controlling to turn on or off the batteries said lithium secondary battery comprising a nonaqueous electrolytic solution containing a compound which is oxidized at a voltage higher than a charge end voltage of the lithium secondary battery and a compound which inhibits reactions at voltages lower than said charge end voltage.

20. The electrical appliance of claim 19 wherein said nonaqueous electrolytic solution is composed of a fluorinated solvent represented by the chemical formula (1) and an aromatic compound represented by the chemical formula (2) below

$Rf_1$-X-$Rf_2$ (1)

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

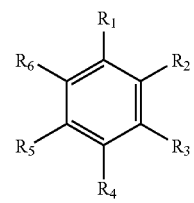

(2)

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

21. The electrical appliance according to claim 20 wherein the fluorinated solvent is methyl nanofluorobutyl ether.

22. The electrical appliance according to claim 20 wherein the aromatic compound is a phenylsilane derivative represented by the chemical formula (3) below

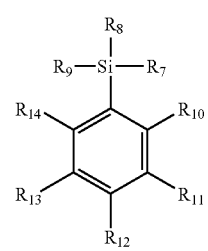

(3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

23. The electrical appliance according to claim 22 wherein said phenylsilane derivative is selected from the group comprising diphenylsilane, diphenylmethylsilane, 4-methylpheyltrimethylsilane, and diphenyldimethoxysilane.

24. The electrical appliance according to claim 19 wherein said appliance is an electric car.

25. An electrical appliance using a lithium secondary battery as a power source which comprises a means for protecting the lithium secondary batteries from overcharging and overdischarging being free from temperature and pressure detection of the batteries, a means for detecting voltages or current of the batteries and a means for controlling to turn on or off the said lithium secondary battery comprising a nonaqueous electrolytic solution characterized in that the lithium secondary battery has a charge capacity of $C_1$ when it (in discharged state) is charged with constant current until a voltage $V_1$ of 1.2V is reached and the lithium secondary battery has a charge capacity of $C_2$ when it is charged further (at a voltage higher than $V_1$) until it cannot be charged any longer, with the ratio (ξ) of $C_1/C_2$ being lower than 0.7.

26. The electrical appliance of claim 25 wherein said nonaqueous electrolytic solution is composed of a fluorinated solvent represented by the chemical formula (1) and an aromatic compound represented by the chemical formula (2) below $$Rf_1\text{-}X\text{-}Rf_2 \tag{1}$$

(where $Rf_1$ denotes an entirely or partly fluorinated $C_{2\text{-}10}$ alkyl group, $Rf_2$ denotes an entirely or partly fluorinated $C_{1\text{-}5}$ alkyl group, and X denotes an ether or ester)

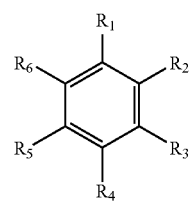

(2)

(where $R_1$, $R_2$, $R_3$, and $R_4$ each denotes hydrogen, fluorine, chlorine, bromine, a $C_{1\text{-}3}$ alkyl group or alkoxyl group, a phenyl group, a phenoxy group, an alkyl-substituted phenyl group or phenoxy group, a $C_{1\text{-}4}$ carboxyl group, a benzyl group, or an alkyl-substituted or alkoxyl-substituted silyl group; and $R_5$ and $R_6$ each denotes hydrogen, fluorine, chlorine, bromine, or a $C_{1\text{-}3}$ alkyl group).

27. The electrical appliance according to claim 26 wherein the fluorinated solvent is methyl nanofluorobutyl ether.

28. The electrical appliance according to claim 26 wherein the aromatic compound is a phenylsilane derivative represented by the chemical formula (3) below

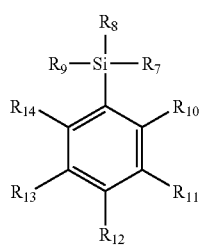

(3)

(where $R_7$, $R_8$, and $R_9$ each denotes hydrogen, a $C_{1\text{-}3}$ alkyl group or alkoxyl group, a phenyl group, a phenoxy group, a benzyl group, fluorine, chlorine, bromine, or a $C_{1\text{-}3}$ alkyl-substituted phenyl group, phenoxy group, or benzyl group; and $R_{10}$, $R_{11}$, $R_{12}$, $R_{13}$, and $R_{14}$ each denotes a $C_{1\text{-}3}$ alkoxyl group, a phenyl group, a benzyl group, or a phenyl group, phenoxy group, or benzyl group substituted with fluorine, chlorine, or bromine).

29. The electrical appliance according to claim 28 wherein said phenylsilane derivative is selected from the group comprising diphenylsilane, diphenylmethylsilane, 4-methylpheyltrimethylsilane, and diphenyldimethoxysilane.

30. The electrical appliance according to claim 25 wherein said appliance is an electric car.

31. An electrical appliance using a lithium secondary battery as a power source which comprises a means for protecting the lithium secondary batteries from overcharging and overdischarging being free from temperature and pressure detection of the batteries, a means for detecting voltages or current of the batteries and a means for controlling to turn on or off the batteries said lithium secondary battery comprising a nonaqueous electrolytic solution containing a compound which is oxidized at a voltage higher than a charge end voltage of the lithium secondary battery and a compound which inhibits reactions at voltages lower than said charge end voltage wherein said nonaqueous electrolytic solution is composed of a fluorinated solvent represented by the chemical formula (1) and an aromatic compound represented by the chemical formula (2) below $$Rf_1\text{-}X\text{-}Rf_2 \tag{1}$$

(where $Rf_1$ denotes an entirely or partly fluorinated $C_{2\text{-}10}$ alkyl group, $Rf_2$ denotes an entirely or partly fluorinated $C_{1\text{-}5}$ alkyl group, and X denotes an ether or ester)

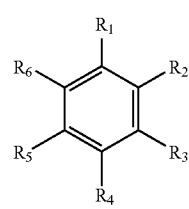

(2)

(where $R_1$, $R_2$, $R_3$, and $R_4$ each denotes hydrogen, fluorine, chlorine, bromine, a $C_{1\text{-}3}$ alkyl group or alkoxyl group, a phenyl group, a phenoxy group, an alkyl-substituted phenyl group or phenoxy group, a $C_{1\text{-}4}$ carboxyl group, a benzyl group, or an alkyl-substituted or alkoxyl-substituted silyl group; and $R_5$ and $R_6$ each denotes hydrogen, fluorine, chlorine, bromine, or a $C_{1\text{-}3}$ alkyl group).

32. The electrical appliance according to claim 31 wherein the fluorinated solvent is methyl nanofluorobutyl ether.

33. The electrical appliance according to claim 31 wherein the aromatic compound is a phenylsilane derivative represented by the chemical formula (3) below

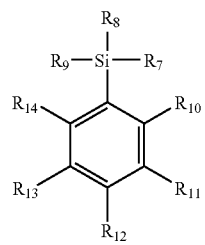

(3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

34. The electrical appliance according to claim 33 wherein said phenylsilane derivative is selected from the group comprising diphenylsilane, diphenylmethylsilane, 4-methylpheyltrimethylsilane, and diphenyldimethoxysilane.

35. The electrical appliance according to claim 31 wherein said appliance is an electric car.

36. An electrical appliance using a lithium secondary battery as a power source which comprises a means for protecting the lithium secondary batteries from overcharging and overdischarging being free from temperature and pressure detection of the batteries, a means for detecting voltages or current of the batteries and a means for controlling to turn on or off the batteries said lithium secondary battery comprising a nonaqueous electrolytic solution characterized in that the lithium secondary battery has a charge capacity of $C_1$ when it (in discharged state) is charged with constant current until a voltage $V_1$ of 1.2V is reached and the lithium secondary battery has a charge capacity of $C_2$ when it is charged further (at a voltage higher than $V_1$) until it cannot be charged any longer, with the ratio (ξ) of $C_1/C_2$ being lower than 0.7 and wherein said nonaqueous electrolytic solution is composed of a fluorinated solvent represented by the chemical formula (1) and an aromatic compound represented by the chemical formula (2) below

Rf$_1$-X-Rf$_2$ (1)

(where Rf$_1$ denotes an entirely or partly fluorinated $C_{2-10}$ alkyl group, Rf$_2$ denotes an entirely or partly fluorinated $C_{1-5}$ alkyl group, and X denotes an ether or ester)

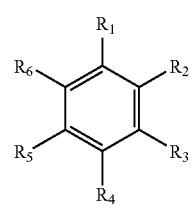

(2)

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

37. The electrical appliance according to claim 36 wherein the fluorinated solvent is methyl nanofluorobutyl ether.

38. The electrical appliance according to claim 36 wherein the aromatic compound is a phenylsilane derivative represented by the chemical formula (3) below

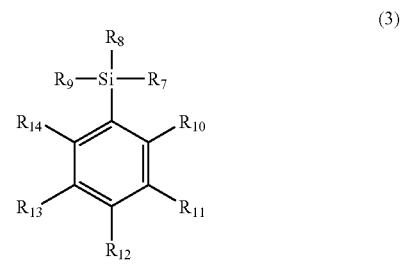

(3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

39. The electrical appliance according to claim 38 wherein said phenylsilane derivative is selected from the group comprising diphenylsilane, diphenylmethylsilane, 4-methylpheyltrimethylsilane, and diphenyldimethoxysilane.

40. The electrical appliance according to claim 36 wherein said appliance is an electric car.

41. A method of fabricating a lithium secondary battery comprising the steps of:
providing an anode;
providing a cathode;
providing a separator; and
providing a nonaqueous electrolytic solution containing a compound which is oxidized at a voltage higher than a charge end voltage of the lithium secondary battery and a compound which inhibits reactions at voltages lower than said charge end voltage.

42. The method of claim 41 wherein said nonaqueous electrolytic solution is composed of a fluorinated solvent represented by the chemical formula (1) and an aromatic compound represented by the chemical formula (2) below

Rf$_1$-X-Rf$_2$ (1)

(where Rf$_1$ denotes an entirely or partly fluorinated $C_{2-10}$ alkyl group, Rf$_2$ denotes an entirely or partly fluorinated $C_{1-5}$ alkyl group, and X denotes an ether or ester)

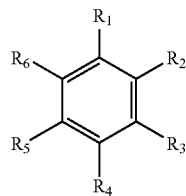

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

43. The method according to claim 42 wherein the fluorinated solvent is methyl nanofluorobutyl ether.

44. The method according to claim 42 wherein the aromatic compound is a phenylsilane derivative represented by the chemical formula (3) below

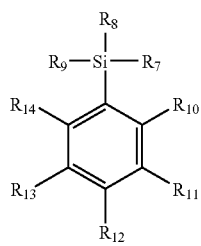

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

45. The method according to claim 44 wherein said phenylsilane derivative is selected from the group comprising diphenylsilane, diphenylmethylsilane, 4-methylpheyltrimethylsilane, and diphenyldimethoxysilane.

46. A method of fabricating a lithium secondary battery comprising the steps of:
providing an anode;
providing a cathode;
providing a separator; and
providing a nonaqueous electrolytic solution characterized in that the lithium secondary battery has a charge capacity of $C_1$ when it (in discharged state) is charged with constant current until a voltage $V_1$ of 1.2V is reached and the lithium secondary battery has a charge capacity of $C_2$ when it is charged further (at a voltage higher than $V_1$) until it cannot be charged any longer, with the ratio (ξ) of $C_1/C_2$ being lower than 0.7.

47. The method of claim 46 wherein said nonaqueous electrolytic solution is composed of a fluorinated solvent represented by the chemical formula (1) and an aromatic compound represented by the chemical formula (2) below $$Rf_1\text{-}X\text{-}Rf_2 \qquad (1)$$

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

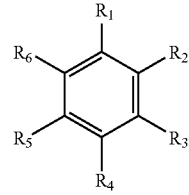

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxyl-substituted silyl group; and $R_5$ and $R_6$ each denotes hydrogen, fluorine, chlorine, bromine, or a $C_{1-3}$ alkyl group).

48. The method according to claim 47 wherein the fluorinated solvent is methyl nanofluorobutyl ether.

49. The method according to claim 47 wherein the aromatic compound is a phenylsilane derivative represented by the chemical formula (3) below

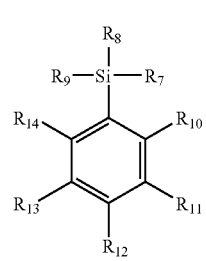

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

50. The method according to claim 49 wherein said phenylsilane derivative is selected from the group comprising diphenylsilane, diphenylmethylsilane, 4-methylpheyltrimethylsilane, and diphenyldimethoxysilane.

51. A method of fabricating a lithium secondary battery comprising the steps of:
providing an anode;
providing a cathode;
providing a separator; and
providing a nonaqueous electrolytic solution containing a compound which is oxidized at a voltage higher than a charge end voltage of the lithium secondary battery and a compound which inhibits reactions at voltages lower than said charge end voltage wherein said nonaqueous electrolytic solution is composed of a fluorinated solvent represented by the chemical formula (1) and an aromatic compound represented by the chemical formula (2) below

 (1)

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

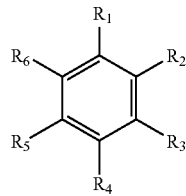 (2)

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxy-substituted silyl group; and $R_5$ and $R_6$ each denotes hydrogen, fluorine, chlorine, bromine, or a $C_{1-3}$ alkyl group).

52. The method according to claim 51 wherein the fluorinated solvent is methyl nanofluorobutyl ether.

53. The method according to claim 51 wherein the aromatic compound is a phenylsilane derivative represented by the chemical formula (3) below

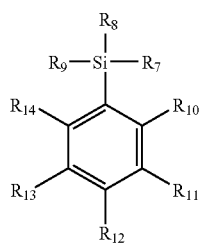 (3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_1$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

54. The method according to claim 53 wherein said phenylsilane derivative is selected from the group comprising diphenylsilane, diphenylmethylsilane, 4-methylpheyltrimethylsilane, and diphenyldimethoxysilane.

55. A method of fabricating a lithium secondary battery comprising the steps of:
providing an anode;
providing a cathode;
providing a separator; and
providing a nonaqueous electrolytic solution characterized in that the lithium secondary battery has a charge capacity of $C_1$ when it (in discharged state) is charged with constant current until a voltage $V_1$ of 1.2V is reached and the lithium secondary battery has a charge capacity of $C_2$ when it is charged further (at a voltage higher than $V_1$) until it cannot be charged any longer, with the ratio (ξ) of $C_1/C_2$ being lower than 0.7 and wherein said nonaqueous electrolytic solution is composed of a fluorinated solvent represented by the chemical formula (1) and an aromatic compound represented by the chemical formula (2) below

 (1)

(where $Rf_1$ denotes an entirely or partly fluorinated $C_{2-10}$ alkyl group, $Rf_2$ denotes an entirely or partly fluorinated $C_{1-5}$ alkyl group, and X denotes an ether or ester)

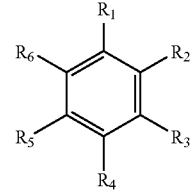 (2)

(where $R_1$, $R_2$, $R_3$, and $R_4$ each denotes hydrogen, fluorine, chlorine, bromine, a $C_{1-3}$ alkyl group or alkoxyl group, a phenyl group, a phenoxy group, an alkyl-substituted phenyl group or phenoxy group, a $C_{1-4}$ carboxyl group, a benzyl group, or an alkyl-substituted or alkoxy-substituted silyl group; and $R_5$ and $R_6$ each denotes hydrogen, fluorine, chlorine, bromine, or a $C_{1-3}$ alkyl group).

56. The method according to claim 55 wherein the fluorinated solvent is methyl nanofluorobutyl ether.

57. The method according to claim 55 wherein the aromatic compound is a phenylsilane derivative represented by the chemical formula (3) below

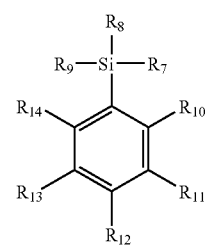 (3)

(where $R_7$, $R_8$, and $R_9$ each denotes hydrogen, a $C_{1-3}$ alkyl group or alkoxyl group, a phenyl group, a phenoxy group, a benzyl group, fluorine, chlorine, bromine, or a $C_{1-3}$ alkyl-substituted phenyl group, phenoxy group, or benzyl group; and $R_{10}$, $R_{11}$, $R_{12}$, $R_{13}$, and $R_{14}$ each denotes a $C_{1-3}$ alkoxyl group, a phenyl group, a benzyl group, or a phenyl group, phenoxy group, or benzyl group substituted with fluorine, chlorine, or bromine).

58. The method according to claim 57 wherein said phenylsilane derivative is selected from the group comprising diphenylsilane, diphenylmethylsilane, 4-methylpheyltrimethylsilane, and diphenyldimethoxysilane.

* * * * *